UNITED STATES PATENT OFFICE.

KARL KREKELER, EDUARD MARTZ, AND ADOLF ISRAEL, OF ELBERFELD, GERMANY, ASSIGNORS TO THE FARBENFABRIKEN OF ELBERFELD COMPANY, OF NEW YORK, N. Y.

BROWN TRISAZO DYE.

SPECIFICATION forming part of Letters Patent No. 603,648, dated May 10, 1898.

Application filed December 14, 1897. Serial No. 661,857. (Specimens.) Patented in Germany September 15, 1891, No. 65,262; in England December 28, 1891, No. 22,641; in France April 28, 1892, No. 221,233; in Italy June 30, 1892, XXVI, 32,191, LXIII, 186, and in Austria-Hungary October 3, 1892, No. 1,242 and No. 16,870.

*To all whom it may concern:*

Be it known that we, KARL KREKELER, EDUARD MARTZ, and ADOLF ISRAEL, doctors of philosophy, chemists, residing at Elberfeld, Germany, (assignors to the FARBENFABRIKEN OF ELBERFELD COMPANY, of New York,) have invented a new and useful Improvement in the Manufacture of Brown Trisazo Dyes, (for which the Farbenfabriken, vormals Fr. Bayer & Co., of Elberfeld, Germany, has already obtained Letters Patent in Germany, No. 65,262, dated September 15, 1891; in England, No. 22,641, dated December 28, 1891; in France, No. 221,233, dated April 28, 1892; in Italy, Reg. Gen., Vol. XXVI, No. 32,191, Reg. Att., Vol. LXIII, No. 186, dated June 30, 1892, and in Austria-Hungary, No. 1,242 and No. 16,870, dated October 3, 1892;) and we hereby declare the following to be a clear and exact description of our invention.

Our invention relates to the production of a new class of trisazo dyestuffs by diazotizing tetrazo bodies of the general formula

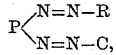

in which formula P represents a radical of the benzidin series, such as diphenyl, ditolyl, diphenolether, or the like; R, the radical of an orthoöxycarbonic acid of the benzene series, such as salicylic acid or cresotinic acid, and C the radical of the so-called "Clève's" alpha-naphthylamin-beta-sulfonic acid, (1.6 or 1.7,) and combining the disazo body thus obtained with one molecule of alpha-naphthylamin or of a monosulfo-acid thereof. The dyestuffs thus obtained have the general formula

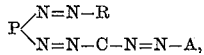

P, R, and C meaning in this formula the above-defined radicals; A, the radical of alpha-naphthylamin or of an alpha-naphthylamin monosulfo-acid. They represent dark powders, which dissolve in water with dark-brown color and dye cotton dark-brown shades, which by a treatment with solutions of chromium and copper salts become faster to washing and against the action of light. The new coloring-matters are also capable of dyeing wool in acid-baths. The shades thus obtained are similar to those produced on cotton.

In carrying out our new process practically we can proceed as follows: 18.4 kilos, by weight, of benzidin are diazotized in the usual manner by means of fourteen kilos, by weight, of sodium nitrite. To the icy-cold diazo solution an icy-cold solution of fourteen kilos, by weight, of salicylic acid and seventy kilos, by weight, of sodium carbonate ($Na_2CO_3$) in four hundred liters of water is added with stirring. When the formation of the intermediate product is finished, a cold solution, prepared by dissolving 24.5 kilos, by weight, of the sodium salt of Clève's alpha-naphthylamin-beta-monosulfo-acid (1.6) in three hundred liters of water, is added. After about a three-hours' stirring the formation of the intermediate dyestuff is complete. The mixture is subsequently acidulated by means of hydrochloric acid and filtered. The dyestuff acid thus obtained is dissolved in fifteen hundred liters of a 2.5 per cent. soda-lye, then quickly mixed with a solution of eight kilos, by weight, of sodium nitrite, five hundred kilos, by weight, of ice, and one hundred and fifty kilos, by weight, of hydrochloric acid, (20° Baumé.) This mixture is stirred for about twelve hours, and then the resulting insoluble diazo compound is filtered and pressed. Subsequently it is mixed with ice and water to a thin paste, which is slowly stirred into an icy-cold concentrated solution of 24.5 kilos, by weight, of the sodium salt of Clève's alpha-naphthylamin-sulfo-acid (1.6 or 1.7) and one hundred and forty kilos, by weight, of sodium carbonate. After stirring for twelve hours the mixture is heated to about 70° centigrade. The dyestuff thus complete is salted out in the usual manner. Then it is filtered off, pressed, dried, and pulverized. It is the sodium salt of an acid having the formula

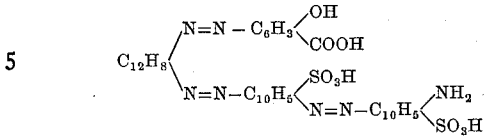

and represents a dark-brown, nearly black, powder easily soluble in water with a dark-brown color, in concentrated sulfuric acid with a bluish-black color. From this solution a violet-black precipitate is obtained on the addition of a sufficient quantity of ice.

The new coloring-matter dyes unmordanted cotton brown shades with a violet tinge, which when treated with solutions of chromium salts, with or without the presence of salts of copper, become more yellowish brown and faster to washing and against the action of light. On unmordanted wool the coloring-matter produces in acid-baths dark-brown shades, which on a treatment with chromium salts become fast against milling.

Having now described our invention and in what manner the same is to be performed, what we claim as new, and desire to secure by Letters Patent, is—

1. The process for producing new trisazo dyestuffs by combining the diazo derivatives of the disazo compounds hereinbefore defined of the general formula

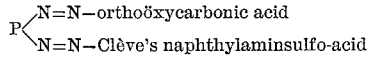

with one molecule of alpha-naphthylamin or of a monosulfo-acid thereof, substantially as hereinbefore described.

2. The process for producing a new trisazo dyestuff by combining the diazo derivative of the disazo body having the formula

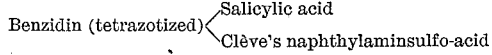

with one molecule of Clève's naphthylamin-sulfo-acid substantially as hereinbefore described.

3. As new articles of manufacture the new trisazo dyestuffs obtainable from the diazo derivatives of the disazo compounds of the general formula

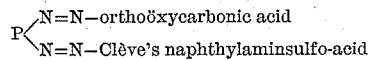

by combination with one molecule of alpha-naphthylamin or of a monosulfo-acid thereof, being dark powders, soluble in water with dark-brown color, dyeing unmordanted cotton dark-brown shades which when treated with solutions of chromium and copper salts become faster to washing and against the action of light, capable of dyeing wool in acid-baths shades similar to those produced on cotton, substantially as described.

4. As a new article of manufacture the specific dyestuff obtainable from the diazo derivative of the disazo body having the formula

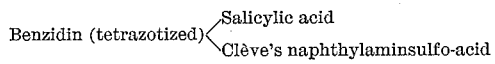

by combination with one molecule of Clève's naphthylaminsulfo-acid being an alkaline salt of an acid having the formula

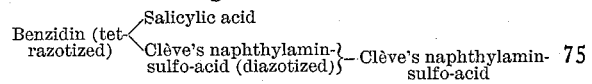

representing in the form of the sodium salt a dark-brown, nearly black, powder, soluble in water with a violet-brown color, in concentrated sulfuric acid with a bluish-black color from which solution a violet-black precipitate is obtained on the addition of a sufficient quantity of ice, dyeing unmordanted cotton violet-brown shades which when treated with solutions of chromium and copper salts become a dark brown with a yellowish hue and faster to washing and against the action of light, yielding on wool in acid-baths dark-brown shades, substantially as described.

In testimony whereof we have signed our names in the presence of two subscribing witnesses.

KARL KREKELER.
EDUARD MARTZ.
ADOLF ISRAEL.

Witnesses:
R. E. JAHN,
OTTO KÖNIG.